United States Patent
Haverkamp

(10) Patent No.: US 10,748,300 B2
(45) Date of Patent: Aug. 18, 2020

(54) TARGET BODY, ARRANGEMENT INCLUDING A TARGET BODY, AND METHOD FOR DETERMINING A POSITION AND/OR AN ALIGNMENT OF A TARGET BODY

(71) Applicant: Carl Zeiss Industrielle Messtechnik GmbH, Oberkochen (DE)

(72) Inventor: Nils Haverkamp, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 16/422,293

(22) Filed: May 24, 2019

(65) Prior Publication Data

US 2019/0362519 A1    Nov. 28, 2019

(30) Foreign Application Priority Data

May 24, 2018 (DE) .................. 10 2018 208 203

(51) Int. Cl.
| | |
|---|---|
| *G01B 11/14* | (2006.01) |
| *G06K 19/06* | (2006.01) |
| *B33Y 50/02* | (2015.01) |
| *G06T 7/73* | (2017.01) |
| *B25J 19/02* | (2006.01) |
| *B23Q 17/24* | (2006.01) |
| *G01B 11/00* | (2006.01) |

(52) U.S. Cl.
CPC .............. *G06T 7/73* (2017.01); *B33Y 50/02* (2014.12); *G01B 11/14* (2013.01); *G06K 19/06028* (2013.01); *G06K 19/06037* (2013.01); *B23Q 17/2428* (2013.01); *B25J 19/023* (2013.01); *G01B 11/005* (2013.01); *G06T 2207/30164* (2013.01); *G06T 2207/30204* (2013.01)

(58) Field of Classification Search
None
See application file for complete search history.

(56) References Cited

U.S. PATENT DOCUMENTS

| | | | |
|---|---|---|---|
| 2014/0364725 A1* | 12/2014 | Makower ............. | A61B 5/6851 600/424 |
| 2017/0258533 A1* | 9/2017 | Crawford ............... | A61B 34/25 |
| 2018/0018778 A1 | 1/2018 | Haverkamp et al. | |

FOREIGN PATENT DOCUMENTS

| | | |
|---|---|---|
| DE | 102015205738 A1 | 10/2016 |
| DE | 102015212352 A1 | 1/2017 |

* cited by examiner

*Primary Examiner* — Idowu O Osifade
(74) *Attorney, Agent, or Firm* — Falk Ewers; Ewers IP Law PLLC

(57) ABSTRACT

A target body includes a plurality of markers, which together form a target for optically capturing and for determining a position and/or alignment of the target body from the captured markers, in particular for determining a position and/or an alignment of a movable part of a coordinate measuring machine, a robot, a material application machine or a machine tool. The target body includes a plurality of surface regions. The surface regions are oriented in different directions. At least one of the markers is arranged in a surface region. In addition, an arrangement which includes a target body and a method for determining a position and/or an alignment of the target body are provided.

21 Claims, 6 Drawing Sheets

TARGET BODY, ARRANGEMENT INCLUDING A TARGET BODY, AND METHOD FOR DETERMINING A POSITION AND/OR AN ALIGNMENT OF A TARGET BODY

CROSS REFERENCE TO RELATED APPLICATIONS

This application claims priority to German patent application DE 10 2018 208 203.0, filed May 24, 2018, the entire content of which is incorporated herein by reference.

TECHNICAL FIELD

The disclosure relates to a target body which has a plurality of markers. Together, the markers form a target for optically capturing and for ascertaining a position and/or an alignment of the target body from the captured markers. In particular, the disclosure facilitates the determination of a position and/or an alignment of a movable part of a coordinate measuring machine, a robot, a material application machine (e.g., a 3-D printer) or a machine tool. The target body or a capture device for optically capturing the markers can be connected to the movable part or the movable part can form at least a portion of the target body such that the position and alignment of the movable part arises, or can be determined, from the position and alignment of the target body. Further, the disclosure relates to an arrangement including the target body and including a capture device for optically capturing the markers. Moreover, the disclosure relates to a method for ascertaining a position and/or an alignment of a target body, in particular for ascertaining a position and/or an alignment of a movable part of a coordinate measuring machine, a robot, a material application machine or machine tool, wherein the target body has a plurality of markers, which together form a target for an optical capture. However, the disclosure is also applicable to the ascertainment of a position and/or an alignment of a target body when recording medical image data and/or when tracking the movement of medical treatment machines, treatment tools and/or treatment devices. By way of example, the target body is connected to the patient such that the position and alignment of at least a region of the patient corresponds to the position and alignment of the target body.

BACKGROUND

Capturing the position and the alignment of a movable part of a coordinate measuring machine on the basis of an optical capture of markers is known from, e.g., DE 10 2015 205 738 A1. Like in an exemplary embodiment of the disclosure, too, the position of the movable part and/or alignment thereof can be used to control or regulate the movement of the movable part.

In particular, the disclosure includes tracking the movement of the target body in order to determine a number of local degrees of freedom of the movement. The movement tracking contains, in particular, a repeated capture of the target body such that the position, the speed and/or the alignment of said target body is/are ascertainable in each case from the result of a capture of the target body, optionally taking account of capture results obtained from an earlier movement state and/or a subsequent movement state. The capture may in particular include recording one or more images of the target body, for example by one or more digital cameras.

In general, a movement state of the target body, in particular the current position, current alignment and/or current speed, can be determined with regard to a number of spatial degrees of freedom of the movement of a tool by evaluating the captured information items, i.e., the information items that are/were obtained during the capture process. By way of example, the tool can be a tactile probe or a sensor, a non-tactile, in particular optical, sensor for determining coordinates of a workpiece, a processing tool (e.g., a mechanical, optical, chemical or other processing tool) for processing a tool, or a tool for adding material to a workpiece. Independently of the specific application, it is often the object to initially ascertain the position and/or alignment of the target body, and hence, in particular, the position and/or alignment of the tool, from the capture.

The number of degrees of freedom of movement to be captured or the number of captured degrees of freedom of movement, and hence also the coordinate axes and/or axes of rotation, with regard to which the position and/or alignment should be established or is established, may be of different magnitude. By way of example, the position can be determined with regard to one, two or three linear axes of the movement or coordinate axes. As an alternative or in addition thereto, the alignment can be ascertained with regard to one, two or three axes of rotation and/or as an alignment vector in a two-dimensional or three-dimensional coordinate system.

If the target body is captured by at least one image, in particular a digital image, methods of image processing known per se can be resorted to when evaluating the captured information items. In general, the ascertainment of the position and/or alignment of the object (e.g., the tool) actually under observation requires the ability to uniquely identify the object or an object connected therewith or a combination of the two objects. Consequently, the identification must be reliable and should be implemented quickly in most applications. If a plurality of objects should be observed simultaneously and, in particular, if the movement thereof should be tracked, the objects must also be uniquely identifiable, or at least distinguishable from one another.

Therefore, the use of so-called targets, which are combined with the actual object to be observed and which are fastened to the latter, for example, is known. The targets can be configured in such a way that they are quickly capturable in a reliable and distinguishable manner. The distinguishability relates not only to different movable objects, but also to a single, or each individual, movable object, which should be distinguishable from its surroundings and its background. Suitably designed targets can also ensure this distinguishability is satisfied.

Particularly when controlling movement processes that are based on so-called movement tracking, i.e., which use, e.g., the position and/or alignment ascertained from the captured information items as a basis for the control, both the capture and the evaluation of the capture information items should be robust, i.e., the susceptibility to errors should be low. Errors may lead to erroneous measurement results, incorrectly processed workpieces, incorrectly produced workpieces and collisions. In medical therapy, corresponding treatment errors may arise in the case of capture errors. This applies if, for example, the treatment is carried out at least in part by a robot.

The preceding and the following description also relate, in particular, to the disclosure and configurations thereof.

As mentioned at the outset, targets may have a plurality of markers which together form the target for an optical capture. Optical is understood to mean that it is electromagnetic radiation that is captured, said electromagnetic radiation, in particular, corresponding to the movement state of the target. Areal markers, i.e., markers that extend along an area, in particular a surface, are already known per se. For areal markers, marker structures extending transversely to the area are not important for the capture in this case. By way of example, such areal markers can be realized as two-dimensional grayscale value distributions or binary distributions. In particular, binary distributions have dark and bright regions, e.g., black and white regions. Examples include one-dimensional barcodes and two-dimensional matrix codes. Areal markers, in particular two-dimensional markers, can be, e.g., printed onto a surface (e.g., by inkjet printing), etched into the surface and/or introduced into the surface in any other way by partial material removal and/or applied by material application. Expressed differently, the surface can be structured in such a way that an aerial marker arises. During the application, a continuous layer with different optical properties can be produced, for example, and/or material can be applied in portions of the surface only.

The markers can be optimized for the respective application. By way of example, they may contain a code or may be combined with a code in order to make these distinguishable from other markers. The markers and hence the targets should also be optimized for determining the position and/or alignment of the target and for specific applications such as the ascertainment of the movement speed.

If the capture information items are two-dimensional information items, as is the case for digital camera images, for example, then it is possible to refer to a viewing direction, in particular the optical axis of the camera, which extends perpendicular to the two-dimensional area of the capture information items. Areal markers whose alignment is not equal to the viewing direction can be considered to be rotated about an axis of rotation extending perpendicular to the viewing direction. A problem arising here is that the same distortion or deformation of the appearance of the marker arises if the marker is rotated from the viewing direction in one rotational direction or in the opposite rotational direction about the aforementioned axis of rotation. Which of two possible alignments the marker has is not ascertainable without additional information items. A single image or, formulated more generally, local two-dimensional capture information items is/are insufficient in this respect.

SUMMARY

It is an object of the present disclosure to provide a target body, an arrangement including a target body and a capture device, and a method for determining a position and/or an alignment of a target body, which make it easier to determine the alignment of the target body from two-dimensional capture information items.

With regard to the target body, the latter has a plurality of surface regions. At least one marker for an optical capture of the target body is arranged in each of the surface regions. The surface regions are oriented in different directions. The markers are, in particular, the aforementioned areal markers.

On account of the at least two surface regions in which at least one of the markers is arranged, it is possible not only to ascertain the alignment of a surface region from two-dimensional capture information items from a capture process of capturing the target body but also to respectively ascertain an alignment for at least two surface regions, and typically for more than two surface regions, of the target body which are oriented in different directions, i.e., which are aligned in different directions.

In particular, one of the markers can extend over at least a part of the surface region in at least one of the surface regions and/or an arrangement of the markers can be arranged in distributed fashion over at least a part of the surface region in at least one of the surface regions such that an orientation of the surface region is ascertainable from an optically captured form of the marker or the arrangement of the markers. With regard to the method design, the at least one marker and/or the arrangement of the markers can be captured, wherein an alignment of the target body is ascertained by processing the capture information items.

If the surface region is a planar surface region, then the alignment is determined by one of the surface normals. If the surface region is curved, its alignment can be determined by the surface normal at a marked point of the surface, for example. In particular, the surface region may have the form of a concave or convex sphere surface, for example. By way of example, the marked point can be a center point of a marker or of an arrangement of markers in the surface region. A center of gravity of the marker or of the arrangement of markers can be determined instead of the center point. Should the center of gravity not lie on the surface, it is possible to determine as the marked point that point on the surface on whose surface normal the center of gravity lies.

Returning to the aforementioned distortion or deformation of a captured marker or an arrangement of markers, which is rotated about an axis of rotation extending perpendicular to the viewing direction of the capture, i.e., the capture direction, what the capture of at least a second surface region with a different alignment, or the capture of the marker or the arrangement of the markers in the surface region, facilitates is obtaining additional information items about the alignment of the entire target body on account of a distortion of the marker or markers in this surface region. As a result, a decision can be made as to whether the markers in the various captured surface regions are rotated in one rotational direction or in the opposite rotational direction about an axis of rotation, which extends perpendicular to the capture direction. Naturally, one of the surface regions can be aligned in the capture direction. In this case, the distortion of the marker or of the arrangement of markers in the at least one further captured surface region supplies an additional information item about the alignment of the entire target body. In particular, this additional information item can be used to ascertain a rotational position of the target body with respect to a rotation about the capture direction.

However, it should be noted that the two-dimensional capture information items need not be explicitly evaluated in such a way that an alignment is determined in each case for at least two of the captured surface regions or the markers arranged therein. Rather, the alignment of the target body can be ascertained directly without such intermediate steps. Further, it should be noted that, although the at least two differently oriented surface regions improve the ascertainment of the alignment of the target body, the alignment of the target body is not uniquely ascertainable in all cases without further additional information items. In particular, many cases do not allow the distinction between movement states of the target body which can be transformed into one another by a rotation of the target body both about an axis of rotation extending perpendicular to the capture direction and by a rotation about the capture direction. Here, depending on the situation, a translational movement may be required in addition to the two rotations in order to be able to transform the two movement states of the target body into one another. It should be noted here that the two rotational movements and, optionally, the translational movement can take place in succession and/or overlaid on one another in any way.

Nevertheless, the capture of a target object with at least two differently aligned surface regions, in which at least one marker is located in each case, leads to a simplification and hence improvement when determining the alignment of the target body. As mentioned, a rotational movement about the capture direction is necessary in order to bring the target body into a movement state in which its alignment cannot be uniquely distinguished from a specific other alignment. Such rotational movements, which would have to take place through approximately 180° around the capture direction, specifically in addition to a rotational movement about an axis of rotation that extends perpendicular to the capture direction, do not occur in practice in many cases or at least do not occur at short time intervals. Therefore, if the movement state of the target body is uniquely known at one time and if the alignment of the target body should be ascertained anew at a time shortly thereafter, then a rotational movement through approximately 180° around the capture direction having taken place in the meantime can be excluded in many cases.

Expressed more generally,
an appearance of the marker or the marker arrangement that is distorted in relation to a capture of the marker or the marker arrangement in the first surface region, which would occur in the direction of the alignment of the first surface region, and/or
an appearance of the marker or the marker arrangement, in the second surface region, that is distorted in relation to a capture of the marker or the marker arrangement in the second surface region, which would occur in the direction of the alignment of the second surface region,
are determined from the two-dimensional capture information items and taken into account when ascertaining the alignment of the target body. An ascertainment device for ascertaining the alignment can have a corresponding configuration.

In particular, a target body, which has a plurality of markers, is provided. Together, the markers form a target for optically capturing and for ascertaining a position and/or an alignment of the target body from the captured markers, wherein
the target body has a plurality of surface regions,
the surface regions are oriented in different directions, and
at least one of the markers is arranged in the surface regions in each case.

In particular, from a capture location, at least two of the markers, which are arranged in different surface regions, are optically capturable at the same time, wherein the capture location is spaced apart from the target body. By way of example, this is the case if a digital camera simultaneously captures the markers in the different surface regions. Therefore, with regard to the method, a configuration is provided, in which at least two of the markers, which are arranged in a plurality of the surface regions of the target body, are optically captured at the same time, wherein at least two of the plurality of surface regions have a different alignment.

Further, an arrangement with the target body is provided, which includes a capture device or a plurality of capture devices. The capture device or the plurality of capture devices is/are configured and arranged in such a way that at least two of the markers, which are arranged in different surface regions, are optically capturable by the capture device or by the plurality of capture devices, in particular without changing the position and without changing the alignment of the capture device or the plurality of capture devices relative to the target body.

In particular, the capture device or the plurality of capture devices produces/produce local two-dimensional capture information items. Therefore, a plurality of capture devices do not capture the markers in the different surface regions from different capture directions in this case, with mutually parallel capture directions not being referred to as different.

In particular, the arrangement further includes an ascertainment device which is connected to the capture device or the plurality of capture devices and which is configured to ascertain a position and an alignment of the target body by processing capture information items, which are obtained by the capture device or the plurality of capture devices by optically capturing the markers in a plurality of the surface regions.

Moreover, a method for ascertaining a position and/or an alignment of a target body is provided, in particular for ascertaining a position and/or an alignment of a movable part of a coordinate measuring machine, a robot, a material application machine or machine tool, wherein the target body has a plurality of markers, which together form a target for an optical capture, wherein
at least two of the markers, which are arranged in the various and differently oriented surface regions of the target body, are captured optically and appropriate capture information items are generated, and
a position and an alignment of the target body are ascertained by processing the capture information items.

In particular, at least two of the markers, which are arranged in a plurality of the surface regions of the target body, are optically captured at the same time in this case, wherein at least two of the plurality of surface regions have a different alignment. However, as already mentioned, the markers in at least two of the differently aligned surface regions can be optically captured in succession in one alternative and the captured information items can be generated therefrom.

At least one of the surface regions can have a code that makes the surface region, a marker in the surface region or an arrangement of markers in the surface region uniquely identifiable. Capturing the code and using an additional information item about which of the surface regions has the code and/or to which marker in the surface region or which arrangement of markers in the surface region the code is assigned allows a unique ascertainment of the alignment of the target body.

Therefore, with regard to the method, the identity of the surface region, of a marker in the surface region or of an arrangement of markers in the surface region can be identified by processing the additional information items about the identity of at least one of the surface regions or at least one marker in the surface region and by evaluating the captured information items with regard to the code in at least one of the surface regions.

However, this is not the only option for uniquely ascertaining the alignment of the target body using additional information items. Expressed more generally, the ascertainment device can therefore be configured, in particular, to ascertain the position and the alignment of the target body also by processing additional information items (present in addition to the captured information items), wherein the additional information items include:
information items about an identity of at least one of the surface regions or at least one of the markers, information items about a form and/or arrangement of the markers, and/or information items about an arrangement of the surface regions and/or about a form of the target body.

Therefore, with regard to the method, the position and the alignment of the target body can also be ascertained by processing such additional information items. The information items about an arrangement of the surface regions may include, in particular, information items about the alignments of the surface regions relative to one another, e.g., angles between the various alignments.

A capture in the direction of the alignment of the respective surface region is understood to mean that the capture direction coincides with the alignment or extends parallel thereto. Therefore, a circular marker will appear circular in the case of a capture in the direction of the alignment. Markers at the corners of an equilateral triangle, which form a marker arrangement in one of the surface regions, appear as lying at the corners of an equilateral triangle when captured in the direction of the alignment. These are merely an example for a marker and an example for a marker arrangement. However, the markers or the marker arrangements can also have a different design and there nevertheless is a non-distorted appearance when captured in the direction of the alignment of the surface region and an appearance that is distorted according to the angle between the capture direction and the alignment of the surface region in every other capture direction. The distortion, which may also be referred to as a deformation, increases when this angle increases.

According to an aspect of the disclosure, the target body has at least three surface regions, wherein at least one of the markers is arranged in each of the three surface regions. Here, the overall arrangement of the markers in the three surface regions is configured in such a way that the markers in the three surface regions would never be captured as lying successively in a straight line from any possible capture direction in the case of a simultaneous capture of the markers. These circumstances can be expressed differently by virtue of the markers in the three surface regions forming an angled arrangement in each of the capture directions which allow a simultaneous capture of the markers in all three surface regions. This means that the areas in respectively two of the three surface regions, in which the marker or the markers are situated, can be interconnected by a straight line; however, the areas in all three surface regions, in which the marker or the markers are situated, cannot be interconnected by a straight line which in each case extends through the center of the area.

According to an aspect of the disclosure, a first of the three surface regions adjoins both a second and a third of the surface regions whereas the second and the third surface region do not adjoin one another. Here, the second surface region adjoins a side of the first surface region that does not lie opposite the side of the first surface region at which the third surface region adjoins the first surface region. Here, the surface regions adjoining one another, i.e., the first and the second surface region and the first and the third surface region, are oriented in different directions, i.e., have different alignments.

Such a configuration of the target body does not allow a transformation of the surface regions onto one another by translational and/or rotational movements, even in the case of the same design of the surface regions and the markers arranged therein. Therefore, the alignment of the target body can be uniquely ascertained by ascertaining the distorted appearance or the distorted appearances of the marker or the marker arrangement in the surface region or the surface regions of the three surface regions and by taking account of the distorted appearance or distorted appearances. Depending on the capture direction, there is at least one of the three surface regions in which the marker or the marker arrangement appears distorted.

In particular, the target body is used for/when establishing a position and/or an alignment of a movable part of a coordinate measuring machine, a robot, a material application machine or a machine tool. Here, the target body or a capture device for optically capturing the markers can be connected to the movable part, or the movable part can form at least a portion of the target body. In all of these cases, determining the position and alignment of the target body, in particular a position and alignment relative to a capturing device, allows the determination of the position and alignment of the movable part. In particular, the movable part can be part of a robot, a coordinate measuring machine, a material application machine or a machine tool, on which a tool is arrangeable or arranged (e.g., in interchangeable fashion by way of an interchange interface). In this way, the position and alignment of the tool can be determined, in particular in a coordinate system of the robot, of the coordinate measuring machine, of the material application machine or of the machine tool. The tool can be, e.g., a measuring sensor (e.g., a tactile or optical sensor) for measuring a workpiece in the case of the coordinate measuring machine, a processing tool for processing a workpiece in the case of the machine tool, a material application tool in the case of the material application machine and such a measuring sensor or such a processing tool in the case of a robot. In another case, the tool is configured to add material to a workpiece, as is the case for a so-called 3-D printer.

The capture device can capture markers of the target body from a capture location or a plurality of capture locations. A change in their position is required for capturing a plurality of capture locations. If, in a given position of the target body, the target body, or the same part thereof, should be captured from a different viewing angle (i.e., in a different capture direction), then a change in the position and a change in the alignment of the capture device are necessary. However, a plurality of capture devices can also optically capture the markers of the target body. Then, the capture devices can be located at different capture locations and then typically have different capture directions, in which they are aligned on the target body. However, the disclosure simplifies the ascertainment of the alignment of the target body in relation to each of the capture directions and the capture information items obtained from this direction.

The at least one capture device can be configured, in particular, to produce at least one image (in particular a two-dimensional image) of at least a part of the target body. The image records markers in at least two of the surface regions oriented in different directions as results of the optical capture. By way of example, the image can be recorded by a capture device configured as a camera. In this case, the plurality of the markers can be captured by recording a single camera image. However, it is also possible for the capture device to move relative to the target body and for the capture to occur during the movement or from different positions along the movement path.

In particular, the target body can have a cutout or an opening, wherein, from a capture location, at least one of the markers is capturable through the cutout or through the opening.

An opening or cutout in the target body, through which at least one of the markers in one of the surface regions is capturable, is advantageous in that the capture direction is also ascertainable using the information item about the cutout and/or opening. Therefore, in particular, an edge or part of an edge of the cutout or the opening is also captured when capturing the target body or a part thereof, for example in the same camera image as the at least one marker in the surface region.

Further, the capture through a cutout or opening facilitates, in particular, also the capture of at least one surface region with at least one marker of the target body, said surface region lying next to the edge of the cutout or opening and, for example, forming the edge or a part of the edge of the cutout or the opening. Expressed more generally, at least one first surface region can be captured through the cutout or opening, and a second surface region can be captured not through the cutout or not through the opening during the capture of the target body. In particular, the first surface region, which is captured through the cutout or opening, lies a distance behind the cutout or opening in the capture direction. Consequently, an arrangement of surface regions in the capture direction or an arrangement of surface regions extending along the capture direction is captured, as a result of which the ascertainment of the alignment of the target body is simplified and/or improved. By way of example, if the alignment of the first surface region behind the cutout or opening is ascertained and if the alignment of the second surface region, which is not captured through the cutout or opening, is ascertained, then the alignment of the target body can be ascertained uniquely and accurately in a simple manner, in particular relative to the capture device or the capture devices, using an additional information item about the arrangement of the surface regions in the three-dimensional space.

In particular, at least a first of the surface regions can be formed by a first portion of the target body, wherein the first portion forms a second of the surface regions and wherein the first surface region and the second surface region are surface regions of the first portion lying opposite one another. With regard to one aspect of the method, at least one of the markers can be captured in the first of the surface regions and at least a further one of the markers can be captured in the second of the surface regions.

Expressed in simplified fashion, a front side and a back side are captured in at least one portion of the target body. Typically, a plurality of capture devices are used to this end, for example respectively at least one digital camera for capturing the first surface region on the front side and the second surface region on the back side of the portion. Here, the first surface region and the second surface region can have the same alignment in the case of reversed orientation; i.e., the respective surface normals extend along the same straight line or parallel to one another. However, it is also possible for the alignments of the first surface region and the second surface region to be different. Capturing both the front side and the back side of the portion improves at least the accuracy of the capture (in particular if the alignments are the same as redundant information items are obtained). In the case of different alignments, additional capture information items are obtained overall in relation to the capture of a single surface region, said additional capture information items improving and/or simplifying the determination of the alignment of the target body. In this case, the first surface region and the second surface region are a special case of the capture of two surface regions, for which the above-described advantages of the capture of two surface regions of the same target body apply. This case shows that the surface regions need not necessarily be captured from the same capture location.

It was already mentioned that the target body may have areal markers. In particular, all markers of the target body may be areal. As an alternative or in addition thereto, at least one surface region of the target body can be formed by a plate-shaped portion of the target body; i.e., the plate-shaped portion has the surface which includes the surface region.

According to an aspect of the disclosure, a plurality of plate-shaped portions of the target body may be present, with the plate-shaped portions each forming at least one of the surface regions and, for example, in each case forming one of the surface regions on the front side and on the back side thereof. In the case of the plate-shaped portion, the surface region or regions are the surface region or regions which do not contain the narrow sides. Plate-shaped is understood to mean that the portion has two parallel large-area external surfaces and, optionally, additional smaller external surfaces on the narrow sides and/or interfaces to an adjacent portion of the target body.

In particular, two immediately adjacent plate-shaped portions are angled with respect to one another in each case such that the surface regions of the adjacent portions are aligned in different directions. In this way, the target body can have, e.g., a total of more than two and, e.g., five plate-shaped portions arranged successively in a row, wherein two portions that are adjacent to one another and consequently directly neighboring one another are angled with respect to one another in each case. When capturing more than two of these portions or markers in the surface regions thereof, the amount of capture information is increased, and the alignment of the target body therefore can be improved in relation to the capture of only two surface regions and, in particular, can be improved with regard to the accuracy. Since the surface regions are aligned in different directions, this also increases the region of possible capture locations, from which at least two of the surface regions can be captured at the same time.

By way of example, plate-shaped portions can be manufactured from a sheet-like material and, in particular, from a metal sheet. Here, it is possible, in particular, to angle the sheet at the boundaries between two adjacent plate-shaped portions (e.g., by bending) and thus create the surface regions. The markers can be introduced into the surface regions before or after the bending.

Apart from the already mentioned methods for producing areal markers, there is also the option, as an alternative or in addition thereto, to create passage openings through the plate-shaped portions, for example. However, this is accordingly also possible if, for example, the target body is a hollow body with a thin layer thickness of the hollow body wall, in particular a hollow sphere. Each of the passage openings that extends through the plate-shaped material or, expressed more generally, through the thin material layer of the plate-shaped material or differently shaped material such as, e.g., a sphere wall, may form a marker or part of a marker. Further, a passage opening can be part of the code or form a code in order to make a marker or an arrangement of markers uniquely identifiable. By way of example, passage openings can be obtained by drilling, milling or etching. A further option for ablating material consists in carrying out electrical discharge machining (usually abbreviated EDM). A further option consists of introducing the passage openings into the material of the target body by laser radiation. In particular, it is possible for a plurality of through holes to be introduced into the material, said through holes having a diameter of a few micrometers and a circular cross section. The arrangement of the holes forms a hole arrangement as a marker or part of a marker, in the style of a digital image made of pixels.

In the case of passage openings, electromagnetic radiation and, in particular, visible electromagnetic radiation can be radiated through the passage openings from the back side from the respective capture location, such that the respective capture device at the capture location receives passed radiation from the surface regions and thus captures the passage openings. By way of example, from the capture location, an appropriate light source can be arranged behind the target body (on the back side thereof). Radiation deflection devices or light sources with a planar extent are suitable as a light source, said radiation deflection devices, e.g., diffusely reflecting or deflecting radiation radiated thereon from a light source.

Typically, the radiation is diffuse in the case of the aforementioned active illumination, from the back side, of the surface regions to be captured, i.e., said radiation is typically directed into a substantial part of the half-space with a constant intensity per solid angle. This facilitates the capture of the target body from the part of the half-space. By way of example, a substantial part of the half-space is at least one-tenth of the half space and, typically, at least one quarter of the half space. As an alternative or in addition thereto, the radiation radiated-in onto the target body from the back side is directed into the entire solid angle range in which possible capture locations for the optical capture of the target body are located or can be located.

As an alternative or in addition to an illumination from the back side, the target body can be illuminated from the front side. In this case, it is typical for the surface regions to be captured to reflect the radiation diffusely, at least in part. "At least in part" should be understood to mean that, for example, the marker or markers reflect diffusely and/or all parts of the respective surface region apart from the marker or markers reflect diffusely. By way of example, all portions in the respective surface region apart from the marker or the markers may reflect radiation diffusely, but not the marker or markers, by contrast, absorbing radiation or being configured as a passage opening, for example. Alternatively, all surface regions apart from the markers or the marker in the surface regions absorb radiation with high absorptance; i.e., they are or appear black. In this case, the marker or the markers in the respective surface region reflects/reflect the radiation radiated-in by the front side, e.g., as diffusely as possible with a high reflectance of, for example, at least 50% and typically at least 80%.

One option for realizing a target body, in particular at least a portion thereof, lies in the use of sheet aluminum, the surface of which is anodized. As is known, the produced oxide layers can be colored during anodization. Not only sheet aluminum but sheet steel, too, can be used for producing at least a portion of a target body. By way of example, the surface of sheet steel can be colored, e.g., by bronzing or blackening. Alternatively, it is also possible to vapor deposit, sputter or electroplate surface layers not only onto sheet metal but onto any suitable material. In this way, it is possible to provide the desired optical properties to parts of the respective surface region, in particular away from the marker or the markers.

A further option includes using material that is transparent to radiation as a material of the target body. In this case, at least the surface regions to be captured are illuminated from their back side. By way of example, in this case, the marker or the markers can absorb radiation, or reflect it back to the back side, to a substantially higher degree than the carrier material that forms the respective surface region. By way of example, the transmittance of the marker or the markers is less than the transmittance of the carrier material forming the surface of the surface region by more than 0.2 and typically more than 0.5.

By way of example, highly diffuse radiation on the back side of the surface regions to be captured can be produced if the target body has an Ulbricht sphere. A radiation source is located in the interior or on the edge of the diffusely reflecting hollow sphere and/or radiation is introduced into the interior of the hollow sphere in any other way (e.g., by way of optical waveguides). The inner side of the sphere wall is diffusely reflecting for the radiation. Similar to what was already described, the markers can be realized in the form of passage openings in the sphere wall (i.e., openings extending through the sphere wall). Optionally, the sphere wall can have at least one large passage opening, i.e., a cutout, which is not part of a marker, but which facilitates the capture through the opening of a surface region with at least one marker on the inner side of the sphere wall.

In general, it is possible for all surface regions in which there is at least one marker for the capture to have the same form and/or the same size. However, it is also possible to design the surface regions of the same target body with different sizes. By way of example, a larger surface of a surface region is advantageous if this surface region is captured from a capture direction that is inclined more strongly to the surface normal than other surface regions. Then, the larger area facilitates a better spatial resolution of the marker or the markers in the surface region during the capture.

Independently of the form of the target body, at least the material in a portion that forms a surface to be captured, provided with at least one marker, can have a self-luminous embodiment. By way of example, an illumination source can be integrated into the material, for example with at least one light-emitting diode. As an alternative or in addition thereto, the material can be excited to radiate by the introduction of energy from the outside. By way of example, radiation at a first wavelength or in a first wavelength range can be radiated onto the material (from the back side, in particular) and said radiation can excite the material to emit radiation at a different wavelength or in a different wavelength range. As an alternative or in addition thereto, the material of the marker can deflect illumination radiation, entering from the side, in the direction of the capture device to a greater degree than the surrounding material.

It is particularly advantageous if both the marker or markers in the respective surface region has/have first optical properties and the remaining part of the surface region has second optical properties that differ from the first optical properties. In particular, this relates to the absorptance and/or reflectance. Typically, the first and the second optical properties each have a diffusive reflectance or absorptance, i.e., the reflectance and/or the absorptance is constant or substantially constant with regard to a large solid angle region. By way of example, the one of the two optical properties can have a diffusive reflectance with a high degree of reflection of at least 50% and typically more than 90% while the other of the two optical properties have a low diffusive reflectance (and hence a correspondingly high absorptance and/or transmittance) of less than 10% and, in particular, less than 2% in the same solid angle region. Consequently, one of the surface types appears black and the other appears white. By way of example, the marker surface can be white and the remaining part of the surface region can be black, or vice versa.

In particular, the at least one marker and/or the material of the surface region away from the at least one marker can be a Lambertian emitter, i.e., an emitter that emits electromagnetic radiation according to Lambert's law. Here, this can relate to reflected radiation and/or emitted radiation. In particular, such a Lambertian emitter can appear black or white. A reflecting surface of a material appears white if it reflects radiation of the wavelength range (that need not necessarily correspond to the visible range) with a high reflectance that, for example, is more than 50% and, in particular, more than 90%. A reflecting surface of a material appears black if it reflects radiation of the wavelength range (that need not necessarily correspond to the visible range) with a low reflectance that, for example, is less than 10% and, in particular, less than 2%.

Particularly if the target body is a hollow body, such as the aforementioned hollow sphere, and if the hollow body has at least one surface region aligned into the interior of the hollow body, which is capturable through a cutout or opening in the hollow body, it is typical for the at least one marker and/or the material of the surface region to be a Lambertian emitter.

By way of example, if the at least one marker has a high reflectance, it is typical for at least the material of the surface region away from the at least one marker to be a Lambertian emitter that appears black. Typically, other surface regions directed into the interior of the hollow body are also Lambertian emitters that appear black in this case, possibly with the exception of the markers in these surface regions which, in turn, are typical to be Lambertian emitters that appear white.

By way of example, if the at least one marker, by contrast, has a low reflectance, it is typical for at least the material of the surface region away from the at least one marker to be a Lambertian emitter that appears white. Typically, other surface regions directed into the interior of the hollow body are also Lambertian emitters that appear white in this case, possibly with the exception of the markers in these surface regions which, in turn, are typical to be Lambertian emitters that appear black. By way of example, the marker or markers in this case could be realized in the form of holes (e.g., passage openings through the wall) of the hollow body.

In the aforementioned combinations of white and black materials or holes, the contrast is high and allows a reliable and accurate capture and evaluation of the capture information items. In the case of a hollow body with at least one inwardly pointing surface region, the design of the further surface regions, which need not necessarily likewise have markers, of the hollow body also contributes to the high contrast.

In the case of the hollow body, particularly in one of the above-described exemplary embodiments, this may relate, in particular, to a self-luminous or transparent hollow body with a light source and/or a light-emergence opening in the interior of the hollow body. Therefore, in particular, at least one marker on a surface region oriented to the outside may appear white, wherein its surface region away from the marker may appear black, for example because it is not transparent and does not transmit light from the interior of the hollow body or because it absorbs said light to a high degree. A hollow body with a transparent, in particular radiation-scattering material is discussed below.

As an alternative or in addition thereto, the surface of the part of the surface region away from the marker or the markers, in particular, can be rough such that radiation is diffusely reflected, i.e., scattered, already on account of the roughness.

A further possible exemplary embodiment of the marker or markers has transparent, yet radiation-scattering material. Therefore, the marker or at least a portion of the marker can be realized, in particular, by virtue of such a transparent, scattering material being integrated into a material of the target body that does not scatter radiation or that scatters radiation less. Provided the transparent, scattering material extends from one surface to an opposite surface or said transparent, scattering material is combined with a radiation source or a radiation deflection device at a back side, radiation can pass through the transparent, scattering material and be scattered in the process such that the marker or a part of the marker is capturable by a capture device by virtue of the radiation capture device receiving the radiation that has passed through the material and scattered.

In general, e.g., metals, glasses, plastics, ceramics and crystalline materials come into question for the target body, particularly in the case of the aforementioned plate-shaped materials, wherein the respective target body may also have a combination of at least two of these materials, e.g., combined in at least one of the portions that forms a surface region. Alternatively, various parts that respectively form one of the surface regions may consist of different materials or material combinations. Depending on the type of introduction or application of the markers, additional material, for example, can be used for the marker or markers.

In particular, as mentioned previously, additional information items about a form and/or an arrangement of the markers and also additional information items about the arrangement of the surface regions and/or the form of the target body can be used when determining the position and/or alignment of the target body. In particular, a projection of a three-dimensional model of the target body, which also contains the markers, onto a two-dimensional capture surface can be carried out, in particular by calculation, in each case. The two-dimensional capture surface is the area in which the respective capture device captures the target body. In the case of a digital camera, the capture surface is the area of the radiation-sensitive photocells.

This projection simulates or corresponds to the capture by the capture device provided it is carried out for the respective position and alignment of the target body relative to the capture surface. However, the projection need not be carried out for a specific position and alignment of the target body relative to the capture surface but can be described mathematically depending on parameters that depend on the specific position and alignment. Nevertheless, these can be referred to as parameters, i.e., characteristic constants, since the respective parameter value is a fixed, constant value for a specific position and alignment.

Now, the captured information items from a single capture device or a plurality of capture devices can be compared to the result of the projection of the model of the target body or the mathematical description of the projection. In so doing, the model is adapted to the captured information items such that the alignment and/or position of the target body is ascertained relative to at least one capture surface. In particular, the aforementioned parameters are ascertained in the process. As a result, the alignment and/or position of the target body, in which the deviations between the projection of the model of the target body on the one hand and the captured information items on the other hand are the smallest, is ascertained. In the process, an Euclidean transformation (rigid transformation), i.e., a transformation maintaining distance and hence also angle, can be carried out or the parameters thereof can be determined. If a plurality of capture devices, i.e., a plurality of two-dimensional capture surfaces, are present, the comparison can be carried out individually or together in one method procedure for the various capture surfaces. Performing this together, i.e., minimizing the differences of the various projections of the target body model on the capture surfaces, is advantageous in that the overall best adaptation is ascertainable in one adaptation process.

In particular, it is possible to capture a plurality of target bodies or at least a plurality of combinations of at least two surface regions with at least one marker each, wherein the combination in each case has at least two surface regions aligned in different directions. These combinations of at least two surface regions in each case can be/can have been formed in the entirety thereof or in part by the same target body. By way of example, four combinations can be arranged relative to one another at the corners of a tetrahedron such that, in the case of a suitable capture direction, a capture device can simultaneously capture at least three of the combinations from each capture location within the tetrahedron. This allows a unique ascertainment of the direction and position. Optionally, the arrangement of the combinations can be realized in this case by virtue of at least one of the combinations being capturable through a cutout or opening in the target body or in one of the target bodies. Even if the combinations are not arranged at the corners of a tetrahedron and the number of combinations differs from four, a plurality of the combinations is used for determining the alignment and/or position (e.g., of a movable part connected to the target bodies). At least one of the target bodies and, typically, a plurality of the target bodies can have an opening or cutout, through which a surface region with at least one marker of the target body is capturable.

The target body and the method can be used, in particular, within the scope of a navigation or as part of an optical navigation system and can be used, for example, for calibrating an optical navigation system. A calibration is possible, in particular with regard to the imaging properties of an individual capture device, e.g., a digital camera, but also, as an alternative or in addition thereto, with regard to the geometric arrangement of a plurality of capture devices relative to one another and/or relative to another coordinate system. Therefore, it is advantageous if the at least one target body does not experience a significant change with regard to its form and optical properties, specifically in the case of a change in temperature, over time and in the case of external influences (such as external forces and vibrations, for example). By way of example, such external forces can act on the target body when it is moved in accelerated fashion and/or when it changes its alignment in the gravitational field. In particular, it is also possible to calibrate movements of the target body relative to at least one capture device and/or in a laboratory coordinate system or global coordinate system, for example by comparison with an additional navigation system. Conversely, a navigation arrangement with at least one capture device and at least one target body, calibrated thus, can be used to calibrate another navigation system.

BRIEF DESCRIPTION OF THE DRAWINGS

The disclosure will now be described with reference to the drawings wherein.

DESCRIPTION OF EXEMPLARY EMBODIMENTS

Figure 1:
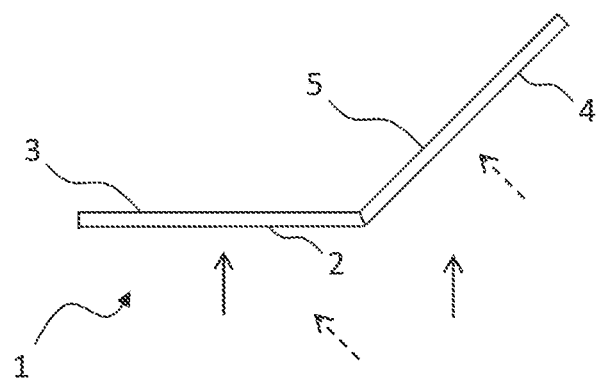
FIG. 1 shows a side view of a first exemplary embodiment of a target body with two plate-shaped portions, which are angled in relation to one another.

FIG. 1 shows a target body 1, which has a first plate-shaped portion 3 and a second plate-shaped portion 5. The plate-shaped portions 3 and 5 are arranged at an angle with respect to one another. By way of example, the angle by which the surface profile bends from the first portion 3 to the second portion 5 is 45°. However, the disclosure is not restricted to surface regions angled by 45°.

The first plate-shaped portion 3 has a first surface region 2 and the second plate-shaped portion 5 has a second surface region 4. The surface regions 2 and 4 each extend over the entire surface of the respective portion 3 and 5, which is oriented to the bottom or bottom right in the illustration of FIG. 1. Each of the surface regions 2 and 4 has one or more markers, which are not visible in FIG. 1 as this is a side view.

Figure 2:
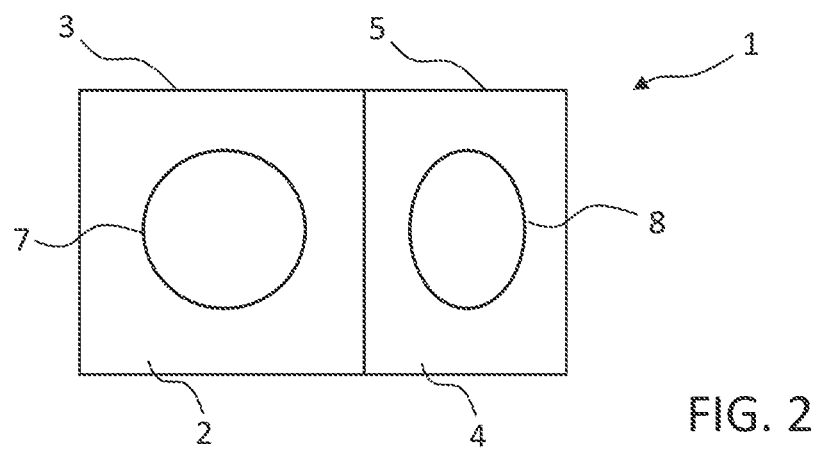
FIG. 2 shows the target body of FIG. 1 in a plan view, with a viewing direction that is illustrated in FIG. 1 by two arrows with uninterrupted lines.

A plan view with a possible configuration of markers is shown in FIG. 2. These are circular markers 7 and 8 in the exemplary embodiment, with a first circular marker 7 being arranged centrally in the first surface region 2 and a second circular marker being arranged centrally in the second surface region 4 in this exemplary embodiment. On account of the viewing direction on which the plan view shown in FIG. 2 is based, the first marker 7 is shown as a circle while the second marker 8 is shown as an ellipse. The greater the angle formed by the surface regions 2 and 4 with respect to one another, the narrower is the ellipse 8 in the viewing direction from below in FIG. 1. The illustrated case corresponds to an angle of 45°.

Figure 3:
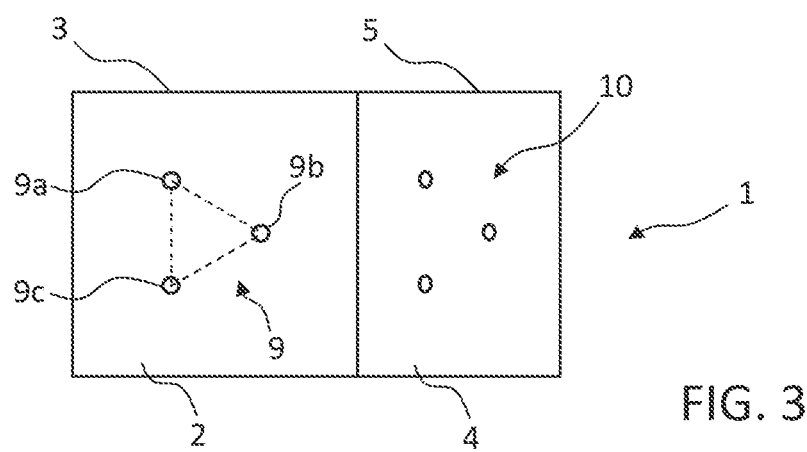
FIG. 3 shows a plan view of the target body illustrated in FIG. 1 from the same viewing direction as in FIG. 2, wherein, however, the two surface regions of the target body oriented toward the bottom or bottom right in FIG. 1 have an arrangement of markers.

FIG. 3 shows a plan view as in FIG. 2, wherein, however, the target body 1 in the first surface region 2 and in the second surface region 4 has an arrangement 9 and 10 of the markers in each case. In the exemplary embodiment shown in FIG. 3, three circular markers, which are positioned at the corners of an equilateral triangle, in each case form the arrangement 9 and 10. For the arrangement 9 illustrated in the first surface region 2, dashed lines, which form the edges of the equilateral triangle, are illustrated for the purposes of elucidating the positioning of the markers 9a, 9b, and 9c. However, such lines are typically not identifiable in the respective surface region. Therefore, only the three individual markers of the arrangement 10 are illustrated for the second surface region 4. In the exemplary embodiment, the markers are very much smaller circular markers in relation to the markers in FIG. 2. However, the disclosure is not restricted to circular markers which together form a marker arrangement within a surface region. By way of example, the markers or the marker arrangement can alternatively be a pattern, for example a pattern made of lines or rectangular areas.

If a capture device for capturing the surface regions, and hence the markers in the surface regions, is located below the target body 1 in relation to the illustration in FIG. 1 and if said capture device captures the surface regions 2 and 4 in the viewing direction illustrated by the arrows with full lines in FIG. 1, then, in particular, an image corresponding to the plan view in FIG. 2 or FIG. 3 arises. This is the case, in particular, if the capture device, e.g., a digital camera, is located at a large distance from the target body 1 in comparison with the width of the surface regions 2 and 4. Otherwise, the viewing directions on the surface regions 2 and 4 that lie adjacent to one another and adjoin one another are not parallel. Rather, the viewing directions diverge in this case. However, particularly if the distance of the capture device from the surface regions 2 and 4 is known, it is possible to correct the effect of diverging viewing directions and to ascertain the alignment of the target body by evaluating the correspondingly corrected capture information items. As an alternative or in addition thereto, the position of the target body 1 can be ascertained from the corrected capture information items, in any case with regard to at least one degree of freedom of movement relative to the capture device. In relation to FIG. 1, the degree of freedom of movement is, in particular, the degree of freedom of the movement direction extending horizontally in FIG. 1.

Although the alignment of the target body 1 is ascertainable from the images corresponding to the plan views in FIG. 2 and FIG. 3 without additional information items, it is not uniquely ascertainable. The same image as illustrated in FIG. 2 also arises if the target body 1 is captured in the viewing direction of the two arrows in FIG. 1 with dashed lines and if the image is then rotated through 180° about its normal. Therefore, the capture device could observe the target body 1 in the other viewing direction instead of the one viewing direction and could be rotated through 180° about its optical axis and would produce the same image.

There are a number of options for additional information items, which permit the unique ascertainment of the alignment of the target body 1 relative to the capture device. Here, a plurality of the different types of additional information items being present and hence redundant additional information items being present is not precluded. This increases the reliability of the evaluation.

One category of additional information items is present if the capture information items from the capture of at least one of the captured surface regions are assignable to one of the surface regions of the target body 1. By way of example, the marker 7 appearing circular in the plan view of FIG. 2 can only be the marker in the first surface region 2 if such an assignment is known or ascertainable.

In particular, such an assignment can be achieved by virtue of at least one of the capturable surface regions, and typically all of the capturable surface regions, having a feature which makes the surface region or one of the markers in the surface region uniquely identifiable and which is capturable by the capture device. The feature can be, for example, a feature of the marker itself or an additional marker such as, e.g., a code (e.g., a barcode or a number or structure), which is unique to the surface region in relation to the entire target body. It is also possible for a plurality of surface regions to have the same distinguishing feature, which makes the surface regions distinguishable from at least one further surface region. Together with further additional information items, such as, e.g., information items about the geometry of the entire target body or of a part of the target body with a plurality of surface regions, this also facilitates the unique determination of the alignment of the target body relative to the capture device.

If this description refers to the use of additional information items for uniquely determining the alignment of a capture device, this correspondingly also includes the use of a plurality of capture devices, e.g., a plurality of cameras, for capturing surface regions and hence markers of the target body. The captured information items, which correspond, e.g., to the plan view illustrated in FIG. 2, are equivalent independently of whether the captured information items are captured by single capture device or a plurality of capture devices. In the case of a plurality of capture devices, it is advantageous, for example, if these form an arrangement that is known in terms of its arrangement geometry and constant of the time, i.e., if the viewing directions and relative positions, for example, of the individual capture devices are known.

A further category of additional information items, which facilitate the unique ascertainment of the alignment of the target body relative to the capture device, is the aforementioned category of geometric information items about the target body. In particular, this may include the various alignments of different surface regions. This allows a unique ascertainment of the alignment, particularly if, for example, the target body has more than the two portions, shown in FIG. 1, with one surface region in each case. By way of example, if a further portion is located in the image plane of FIG. 1 behind the portion 3, the surface region of said further portion with at least one marker arranged therein likewise being captured, then the already mentioned images from the various viewing directions can be uniquely distinguished from one another, even despite a possible rotation through 180° about the optical axis of the capture.

Figure 4:
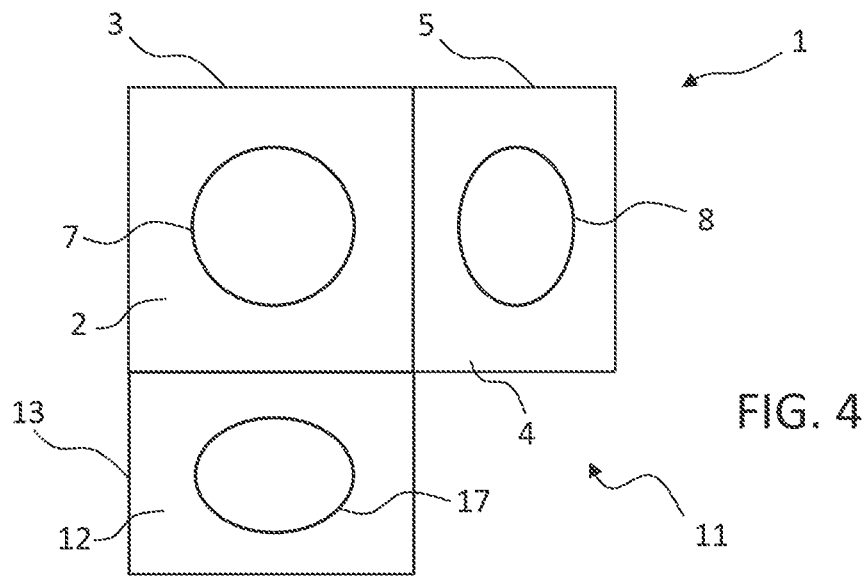
FIG. 4 shows a plan view corresponding to FIG. 2 of a target body, which has three portions with a respective surface region, in which at least one marker is located in each case according to a second exemplary embodiment, FIG. 5 schematically shows an arrangement with a target body and a capture device, which is connected to an ascertainment device for ascertaining a position and/or alignment of a target body.

FIG. 4 shows a view of such a target body 11, which has the portions 3 and 5 of the target body 1 of FIG. 1 and, additionally, a third portion 13. The third portion 13 adjoins the first portion 3 and has a third surface region 12 with a circular marker 17 that appears elliptical in the illustrated plan view corresponding to that of FIG. 2.

Figure 5:
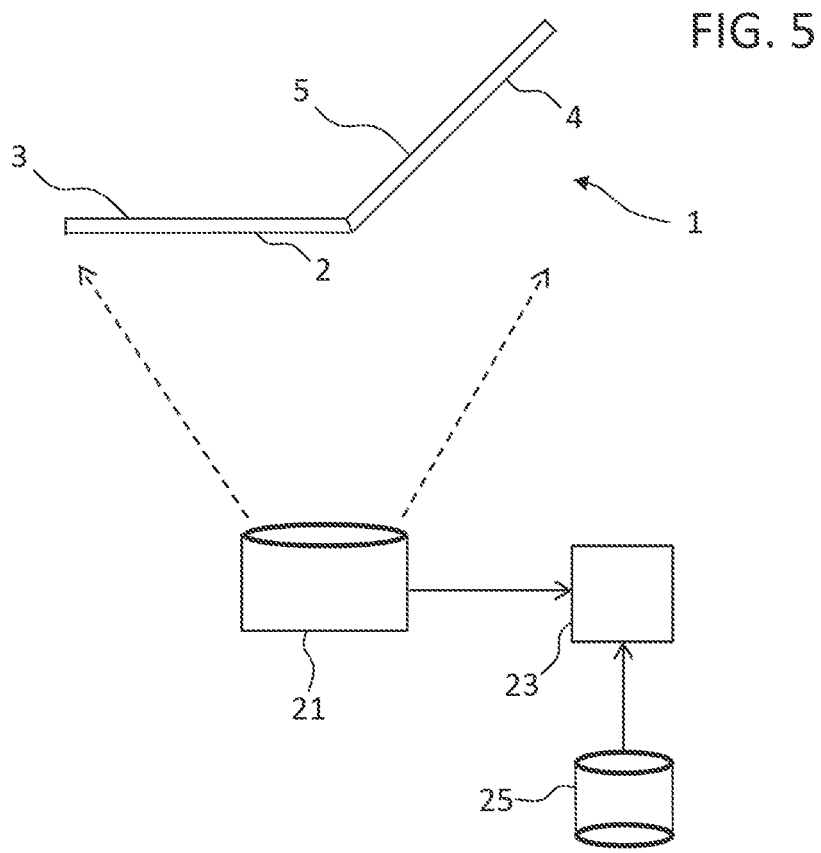

FIG. 5 shows a schematic illustration with a side view of a target body 1, for example the target body 1 of FIG. 1. However, instead of this target body 1, any other target body that is described in this description or that falls under the scope of the present disclosure may be part of the arrangement. The target body 1 illustrated in FIG. 5 has two portions 3 and 5, which each have a surface region 2 and 4 with at least one marker in each case. A capture device 21, e.g., a digital camera, is arranged in such a way that it can simultaneously capture the two surface regions 2 and 4 and, for example, can record a camera image of the arrangement of the surface regions 2 and 4. The capture device 21 is connected to an ascertainment device 23 or controller/processor configured to determine an alignment and/or a position of the target body 1 relative to the capture device 21. Moreover, the ascertainment device is connected to a data memory 25.

During the operation of the arrangement, the capture device 21 captures the surface regions 2 and 4 or, in the case of a different target body, at least two of the surface regions of the other target body. The capture device captures the surface regions optically and, in particular, it captures the surface regions without changing the position and without changing the alignment of the capture device relative to the target body.

As mentioned, the capture device can be a digital camera. Alternatively, it can be an optical scanner, e.g., a laser scanner. Additionally, a plurality of capture devices, which capture the surface regions of the target body, can be part of the arrangement instead of a single capture device 21.

Capture information items which, in particular, correspond to a single alignment and/or a single position of the target body relative to the capture device or plurality of capture devices are available as a result of capturing the target body. The capture information items are transmitted to the ascertainment device 23, which determines the position and/or alignment of the target body relative to the capture device or the plurality of capture devices. To this end, the ascertainment device 23 typically also uses additional information items, which are stored in the data memory 25. In particular, the additional information items are used to uniquely ascertain the alignment of the target body relative to the at least one capture device.

By way of example, if the capture information items correspond to the plan view illustrated in FIG. 2 and the first marker 7 was therefore captured as a marker 7 that appears circular, what is immediately deduced therefrom is that the surface region in which the marker 7 is located is aligned in the direction of the capture device. By way of example, if the markers are captured but not the outlines of the associated surface regions, then the alignment of the entire target body cannot yet be deduced from the orientation of an individual surface region or of the marker arranged therein. In particular, it is not possible to deduce the alignment of the entire target body in three-dimensional space. However, the captured information items also have information items about the appearance of the second marker 8 in the second surface region 4. The second marker 8 appears as an ellipse. From this, it is possible to deduce the alignment of the second surface region or the second marker 8 in three-dimensional space by determining the profile of the major axis and the minor axis and/or by determining the eccentricity. To this end, only the information item that relates to circular markers 7 and 8, in particular, is required, as is also the case with regard to ascertaining the alignment of the first surface region 2 or the first marker 7. Now, the alignment of the first surface region 2 or the first marker 7 in three-dimensional space can be deduced from the ascertained alignment of the second surface region 4 or the second marker 8.

By way of example, the alignment can be ascertained in relation to a coordinate system in which the target body is movable. By way of example, this relates to the coordinate system of the capture device or a laboratory or machine coordinate system. By way of example, if, for an initial movement state of the target body, the center point of the first circular marker 7 is known to be located at a certain point in space and the center point of the second circular marker 8 is known to be located at another certain point in space, then the alignment of the target body relative to the initial movement state can be ascertained after a movement of the target body.

Here, a plurality of alignments may come into question as fitting the capture information items, despite an implemented ascertainment of the alignment of the target body. This has already been discussed. The alignment can be uniquely determined by using suitable additional information items.

By way of example, if an arrangement of markers is present in one or more surface regions, as illustrated in the plan view shown in FIG. 3, the relative position and alignment of the individual markers of the respective arrangement of markers can be ascertained from the captured information items. If, as shown in FIG. 3, an arrangement of markers at the corners of an equilateral triangle appears undistorted, i.e., if the markers appear at the corners of an equilateral triangle even in the viewing direction of the capture device, it is possible to deduce that the associated first surface region 2 is aligned in the viewing direction. The alignment of the second surface region 4 or the associated marker arrangement can be deduced from the distorted appearance of the marker arrangement in the second surface region 4, for example from the ratio of the side lengths of the triangle, at the corners of which the markers are located, or from other geometric variables of this triangle, such as the angles between the sides at the corners of the triangle, for example. This once again allows the ascertainment of the alignment of the target body in three-dimensional space, in a manner analogous to what was already described for circular markers.

The determination of the position of the target body from the captured information items can be ascertained, for example, using the center points of the circular markers 7 and 8 ascertained from the captured information items, for example in relation to the plan view of FIG. 2, or the center points or centers of gravity of the triangles, for example in the case of the plan view of FIG. 3. Here, since the captured information item may be a locally two-dimensional information item such as, for example, a two-dimensional camera image, it may be the case that the distance of the target body from the capture device is not ascertainable or only ascertainable inaccurately from the captured information items. Therefore, the position of the target body relative to the capture device can only be determined in relation to a two-dimensional coordinate system, for example, even though the target body can be aligned accurately relative to the capture device with respect to a three-dimensional coordinate system.

However, optionally, there can also be ascertainment of a variable, captured by the capture information items, of at least one marker or at least one arrangement of markers in at least one surface region. By way of example, if the capture information items relate to a digital two-dimensional camera image, the radius or the diameter of a marker that appears circular and/or the length of the major axis and the length of the minor axis of a circular marker that appears elliptical can be ascertained. Particularly if the imaging scale of the image of at least one of the circular markers is known within the capturing process, this allows deductions to be drawn about the distance of the target body from the capture device and consequently about the position of the target body in a three-dimensional coordinate system.

Figure 6:
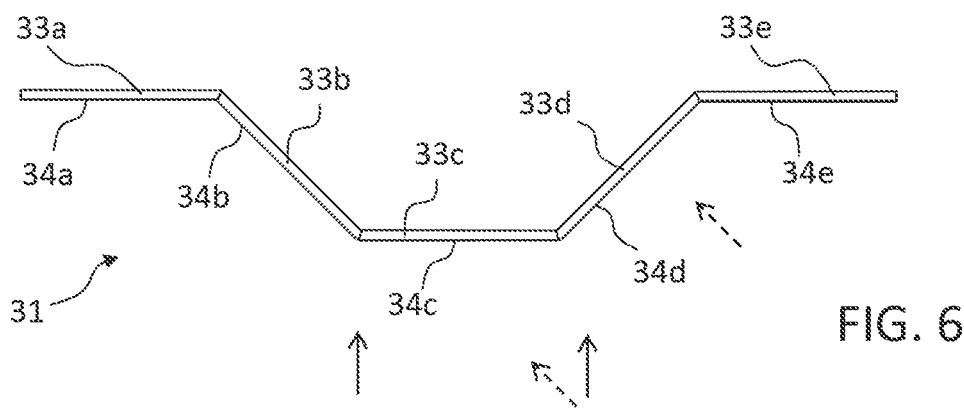
FIG. 6 shows a side view similar to the side view of a target body shown in FIG. 1, wherein the target body includes five portions, which each have a surface region that is aligned downward or obliquely downward.

As an alternative or in addition thereto, it is possible to ascertain the ratio of the markers and/or marker arrangements in different captured surface regions from the captured information items. The ratio allows ascertainment of which of the captured surface regions is arranged at a greater distance from the capture device. This represents an additional information item for ascertaining the alignment of the target body. By way of example, a target body can have three portions with a surface region in each case, at least one marker or one marker arrangement being located in each surface region. If these three surface regions are arranged like, for example, the surface regions 34a, 34b, and 34c of the target body 31 in FIG. 6, the ratio of the images of the circular markers 37a and 37c (see FIG. 7 for a plan view from a certain viewing angle) can be ascertained from the image of these three surface regions. The larger circle in the capture information items must belong to the surface region 34c lying closer to the capture device. Therefore, no additional information items are required in order to uniquely determine the alignment of the target body in three-dimensional space. The specified example with the three surface regions assumes that not every one of the five surface regions of the target body 31 illustrated in FIG. 6 is captured or that this relates to a different target body, which only has the specified three surface regions with at least one marker in each case.

Returning to FIG. 6, the target body 31 illustrated therein has five portions 33a to 33e, which each have surface regions 34a to 34e. At least one marker or one arrangement of markers is located in each of the surface regions.

Figure 7:
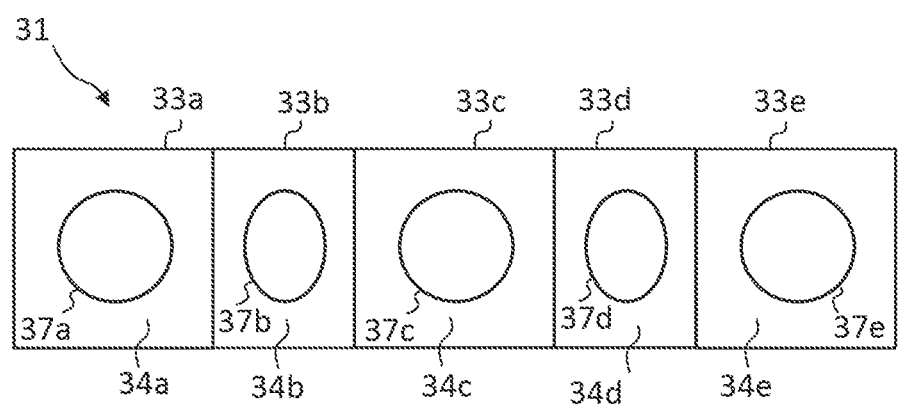
FIG. 7 shows a plan view similar to the plan view illustrated in FIG. 2, albeit on the target body illustrated in FIG. 6, wherein the viewing direction extends in the direction of the arrows in FIG. 6, which have uninterrupted lines.

In the plan view of the target body 31, which is illustrated in FIG. 7, images of circular markers 37a to 37e can be seen; i.e., a circular marker is located in each of the surface regions 34a to 34c in this exemplary embodiment. The viewing direction of the plan view in FIG. 7 corresponds to the two arrows in FIG. 6 with uninterrupted lines, which point from bottom to top in the plane in FIG. 6. Therefore, the circular markers 37a, 37c, and 37e in the first surface region 34a, in the third surface region 34c, and in the fifth surface region 34e are captured as circular. By contrast, the circular markers 37b and 37d in the second surface region 34b and in the fourth surface region 34d are captured as an ellipse. The ellipses correspond to the inclination of the alignment of the second and fourth surface region 34b and 34d in relation to the viewing direction. The two ellipses appear in the case of the same ratio of major axis to minor axis and in the case of the same size. Therefore, the alignment is not uniquely ascertainable.

However, the alignment can be uniquely ascertained using additional information items. By way of example, the target body 31 can also be captured from a different capture location. Then, the alignment can be uniquely ascertained from the entire overall image/all information items.

As an alternative or in addition thereto, a code that is also captured during the capturing process may be located, in particular, at least in one of the surface regions 34a, 34b, 34d, and 34e. By comparing the captured code with the additional information item that the code belongs to a certain surface region or the marker arranged therein, it is possible to uniquely ascertain the alignment.

Figure 8:
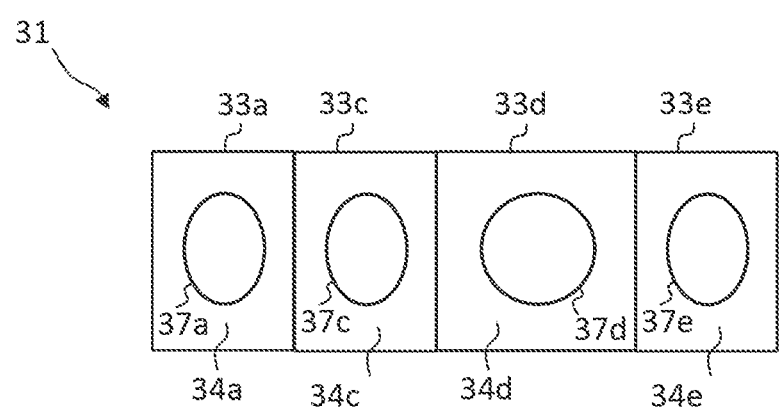
FIG. 8 shows a plan view from the bottom right on the target body illustrated in FIG. 6, i.e., with a viewing direction in the direction of the arrows in FIG. 6 that are illustrated using interrupted lines.

The plan view in FIG. 8 shows the target body 31 illustrated in FIG. 6, as seen from bottom right in FIG. 6, in accordance with the arrows with interrupted lines. The second surface region 34b is not visible in this plan view since the viewing angle does not facilitate the capture thereof. Therefore, only images of four circular markers 37a, 37c, 37d, and 37e appear. This elucidates that, in general, it is not possible for all surface regions to be captured from a certain viewing direction. This follows from the feature of the target body that the various surface regions are aligned in different directions.

Figure 9:
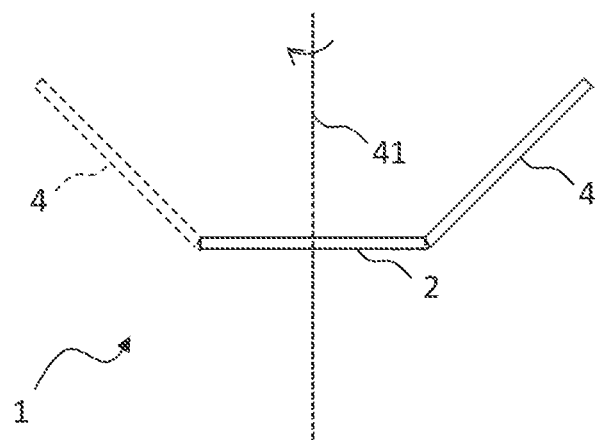
FIG. 9 shows the target body illustrated in FIG. 1 in a first rotational position about an axis of rotation extending in the capture direction, wherein a rotated position rotated about the axis of rotation is indicated.
Figure 10:
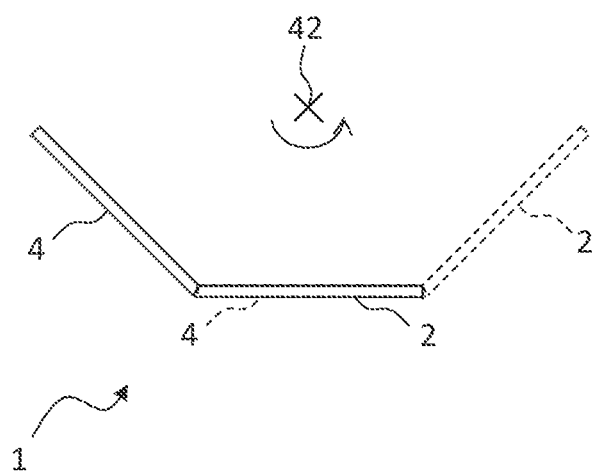
FIG. 10 shows the target body illustrated in FIG. 9 in a rotational position that corresponds to the rotational movement elucidated by FIG. 9, wherein a further rotational position about an axis of rotation extending perpendicular to the capture direction and consequently also perpendicular to the plane is indicated.

FIGS. 9 and 10 now are used to describe how non-unique results with regard to the ascertainment of the alignment of the target body may arise despite the at least two surface regions of a target body that are aligned in different directions.

If the target body 1 with two surface regions 2 and 4, illustrated in FIG. 9, is captured from below in relation to the plane in FIG. 9 and if corresponding two-dimensional capture information items are produced, then this cannot be used to uniquely ascertain the direction in which the target body 1 is aligned without additional information items. In order to elucidate this, two rotational movements are described on the basis of FIG. 9 and FIG. 10, the execution of which can transform the two illustrated surface regions 2 and 4 of the target body onto one another provided the surface regions have the same form. Therefore, if markers or marker arrangements with the same design are present at the same positions with regard to the edges of the surface regions in the surface regions 2 and 4, the same capture information item is obtained by capturing the target body 1 in the initial position and after carrying out the two rotational movements.

In the initial position of the target body 1, which is illustrated in FIG. 9 by the uninterrupted lines, the first surface region 2 is aligned in the capture direction. An axis of rotation 41 extends in the capture direction, said axis of rotation being an imaginary axis of rotation since there is not a corresponding shaft present and the transformation movement need not be carried out in isolated fashion about this axis of rotation 41. The second surface region 4 is aligned toward the bottom right. By rotating the target body 1 through 180° about the axis of rotation 41, the second surface region 2 is transformed onto itself and the second surface region 4 is transformed onto the surface region aligned toward the bottom left, as illustrated to the left in FIG. 9 by dashed lines. This is the initial position in FIG. 10, which is illustrated with non-interrupted lines therein.

By rotating the target body 1 about a further axis of rotation 42, which extends perpendicular to the plane in FIG. 10 and consequently also perpendicular to the capture direction (see the direction of the axis of rotation 41 in FIG. 9), the first surface region 2 is rotated in such a way that it is now aligned toward the bottom right, and the second surface region 4 is rotated in such a way that it is now aligned to the bottom in the capture direction. By way of example, if both surface regions 2 and 4 are square and have a circular marker with the same form in the center thereof, an image of the markers in the initial position of FIG. 9 and an image of the markers in the final position of FIG. 10 cannot be distinguished from one another. As already mentioned, the various movement states can be distinguished from one another if additional information items are present. By way of example, this is the case if the first surface region has a code by which it can be uniquely identified or at least can be unambiguously distinguished from the second surface region 4.

Although a transformation of the surface regions 2 and 4 on the basis of FIG. 9 and FIG. 10 would describe a transformation onto itself, this transformation is not insignificant since the target body is coupled to other parts in practice and the other parts are therefore also rotated when rotating the target body.

Figure 11:
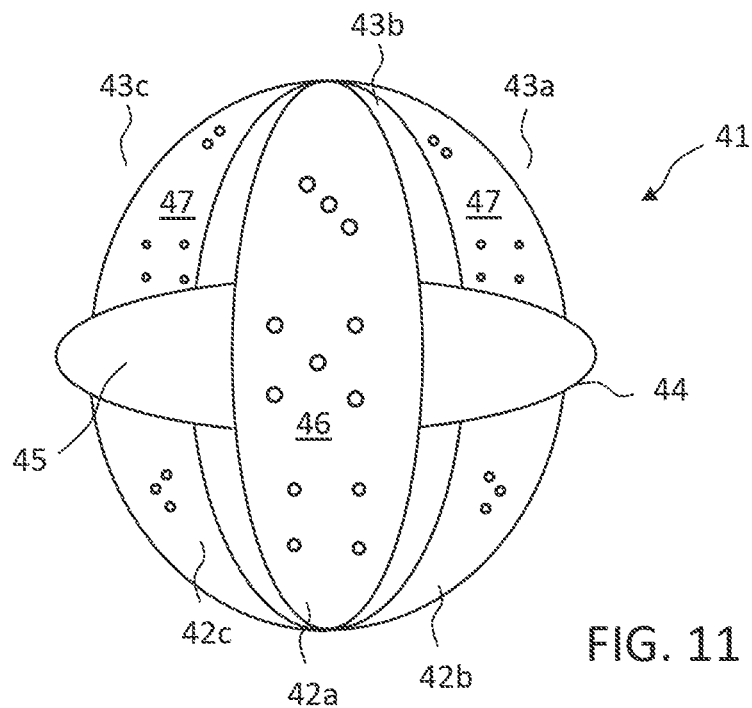
FIG. 11 shows a view of a target body which has the form of a hollow sphere with walls that are cutout at three positions.

FIG. 11 shows a target body 41, the external surface of which extends on a sphere surface. However, the outwardly directed surface regions of the target body 41 do not form a closed spherical surface. Rather, cutouts 43a, 43b, and 43c are located between the three illustrated material portions 42a, 42b, and 42c of the target body 41, which form the exterior surfaces. The equator 44 of the sphere is indicated by a circular line. In practice, a circular disk 45 can be arranged level with the equator 44 in order to increase the stability of the target body 41. As is identifiable from FIG. 11, however, the view of portions of the surface regions is impeded by the circular disk 45; i.e., areas of the material portions 42b, 42c below the equator 44 are covered.

In the exemplary embodiment, three material portions 42a, 42b, and 42c extend from one pole (at the top in FIG. 11) to the other pole (at the bottom of FIG. 11) of the sphere. These material portions 42 do not only have the aforementioned exterior surface but also, in each case, an interior surface aligned inwardly, toward the sphere center. Consequently, six surface regions arise, of which, in the illustration of FIG. 11, only one outwardly directed surface region 46, formed by the portion 42a, and two inwardly directed surface regions 47, formed by the second portion 42b and the third portion 42c, are identifiable. By contrast, in the plan view of FIG. 12, the upper partial surface regions of all outwardly directed surface regions 46 are identifiable. The edges of the portions 42 extend from pole to pole, respectively on a circumference. As illustrated in the exemplary embodiment, the cutouts 43 in each case extend over a larger region of the sphere surface than the material portions 42. As a result, the surface region on the interior side of the material portion 42 can be captured from a comparatively large solid angle range outside of the sphere, in each case through a cutout 43.

Arrangements of markers are schematically illustrated in the surface regions 46 and 47, with each marker having the form of a small circle. In principle, all previously described types of production of these markers come into question. By way of example, the markers may, however, be realized by drilling through the respective material portion 42.

Figure 12:
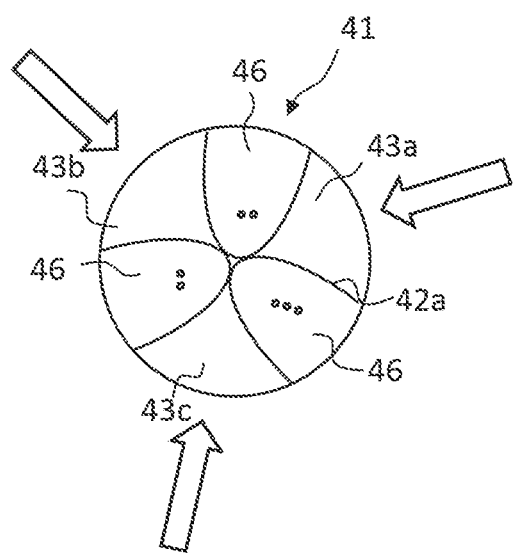
FIG. 12 shows a plan view from above on the perforated hollow sphere illustrated in FIG. 11, wherein arrows indicate the capture directions of three different capture devices.

As illustrated schematically in FIG. 11, for example, three capture devices can capture surface regions of the target body 41 in the three capture directions indicated by the arrows. Particularly if the edges of the cutouts or material portions are also taken into account when evaluating the capture information items, it is possible to uniquely capture the alignment and position of the target body 41 with great reliability. However, even if the edges of the cutouts are not taken into account during the evaluation, such reliable evaluation is possible since all three capture devices are able to capture a large proportion of the material portions 42 and hence are able to capture a large number of markers in each case. However, the capture the target body 41 is not restricted to the use of an arrangement of three capture devices as shown in FIG. 12. By way of example, only one capture device may be used as well.

As already mentioned, large cutouts are advantageous. It is typical for the marker-carrying portions to each assume half or less than half of the capture region that can be captured by the capture device.

Further, in the case of a sphere-type target body such as the target body 41 in FIG. 11 and FIG. 12, it is typical for the cutouts and material portions to be distributed uniformly over the circumference at the equator and further for an odd number of material portions and cutouts to be present so that a material portion has a cutout lying opposite thereto in each case in an approximately equator-side plan view as in FIG. 11 and the capture of the interior surfaces through the cutout is facilitated.

The interior of a hollow body can be illuminated, particularly if a hollow body, like the spherical hollow body 41 illustrated in FIG. 11 and FIG. 12, has passage openings as markers. By way of example, an illumination source can be arranged at the center of the sphere in the case of a spherical target hollow body. However, the emission of illumination radiation in the direction of cutouts is typically prevented, for example blocked by appropriately formed shielding. Optionally, a marker or an arrangement of markers can be present on the respective shield such that the exterior surface of the shielding also forms a capturable surface region of the target body.

Figure 13:
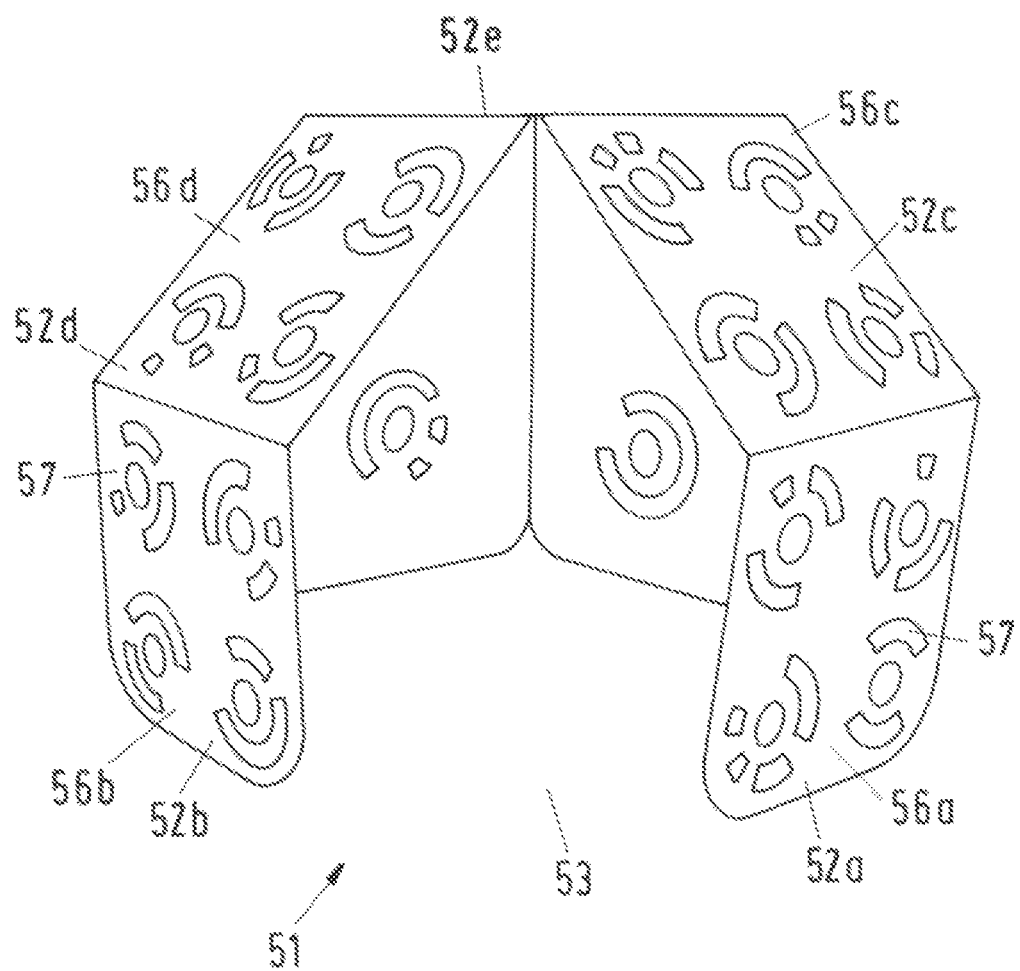
FIG. 13 shows a target body with a plurality of surface regions in which an arrangement of markers is present in each case, wherein the target body has cutouts through which markers arranged at surfaces oriented inward, into the interior of the target body, are capturable.

FIG. 13 shows a target body 51 with a plurality of plate-shaped materials regions 52, which each approximately have the form of a rectangle, wherein, however, individual corners of the respective rectangle may be rounded. Two material portions 52a and 52b with outwardly pointing surface regions 56a and 56b, respectively, are identifiable in the foreground. Located thereover, there respectively is a material portion 52c and 52d, which extends at an angle in relation to the portion 52a and 52b lying further below. Here, the upper portions 52c and 52d run towards one another such that they respectively touch at a corner. A roof-shaped surface region 52e is not visible in FIG. 13. Further material regions are partly covered in the view of FIG. 13. However, a cutout 53 is located between the material regions 52a and 52b, through which cutout interior surfaces of the target body 51 are visible and consequently also capturable.

Markers are arranged in the surface regions of the target body 51 that are aligned toward the inside and toward the outside, i.e., in particular, in the surface regions 52a to 52d as well. Here, in the exemplary embodiment, each marker 57 includes a bright circular region, which is surrounded by circular ring segments. Each arrangement of circular ring segments occurs only once on the target body 51 with this combination of form and number of circular ring segments, and so each marker is uniquely identifiable. Therefore, already the alignment of a single one of the surface regions, such as, e.g., of the surface region 56b, can be ascertained from the two-dimensional capture information items, which contain the appearance of the four markers on the surface region 56b captured by the capture device. Naturally, this assumes knowledge about which uniquely identifiable marker is located at which location on the surface of the target body 51.

Two further markers are visible, and consequently capturable, through the cutout 53 on an inwardly pointing surface of the target body 51. Therefore, redundant information items can be obtained when capturing the target body 51, said redundant information items facilitating reliable and unique ascertainment of the position and alignment of the target body.

It is understood that the foregoing description is that of the exemplary embodiments of the disclosure and that various changes and modifications may be made thereto without departing from the spirit and scope of the disclosure as defined in the appended claims.

What is claimed is:

1. A target body comprising:
   a plurality of markers forming a target to be optically captured and to determine a position and an alignment of the target body from the plurality of markers optically captured, the target body being a movable part of a coordinate measuring machine, a robot, a material application machine, or a machine tool;
   a plurality of surface regions, the plurality of surface regions being oriented in different directions, and at least one of the plurality of markers being arranged in each of the plurality of surface regions; and
   the target body defining a cutout or an opening and at least one of the plurality of markers being capturable through the cutout or through the opening from a capture location.

2. The target body as claimed in claim 1, wherein:
   at least two of the plurality of markers arranged in different surface regions are optically capturable at a same time from the capture location, and
   the capture location is spaced apart from the target body.

3. The target body as claimed in claim 1, wherein at least one of the plurality of surface regions has a coding to permit the at least one of the plurality of surface regions, a marker in the at least one of the plurality of surface regions, or an arrangement of markers in the at least one of the plurality of surface regions to be uniquely identifiable.

4. The target body as claimed in claim 1, wherein:
   in at least one of the plurality of surface regions, one of the plurality of markers extends over at least one portion of the at least one of the plurality of surface regions, and/or
   in the at least one of the plurality of surface regions, an arrangement of the plurality of markers is distributed over the at least one portion of the at least one of the plurality of surface regions
   to permit an orientation of the at least one of the plurality of surface regions to be determined from an optically captured form of the one of the plurality of markers or from the arrangement of the plurality of markers.

5. The target body as claimed in claim 1, wherein:
   at least a first of the plurality of surface regions is formed by a first portion of the target body,
   the first portion forms a second of the plurality of surface regions, and
   the first of the plurality of surface regions and the second of the plurality of surface regions are surface regions of the first portion lying opposite to one another.

6. The target body as claimed in claim 1, wherein:
   at least some of the plurality of surface regions extend in a surface plane, and
   at least one of the plurality of markers or at least one arrangement of the plurality of markers extends along the surface plane.

7. The target body as claimed in claim 1, wherein the target body is configured to:
   permit a first surface region to be captured through the cutout or the opening, and
   prevent a second surface region from being captured through the cutout or through the opening.

8. The target body as claimed in claim 7, wherein at least one of the plurality of surface regions lies next to an edge of the cutout or the opening to permit at least one of the plurality of markers in the at least one of the plurality of surface regions and one of the plurality of surface regions next to the edge of the cutout or the opening to be capturable from the capture location.

9. The target body as claimed in claim 1, wherein the target body defines a plurality of cutouts through which at least one of the plurality of markers is capturable from the capture location.

10. An arrangement comprising:
    the target body as claimed in claim 1; and
    a capture device or a plurality of capture devices configured and arranged to permit at least two of the plurality of markers arranged in different surface regions of the plurality of surface regions to be optically capturable by the capture device or by the plurality of capture devices without changing the position and the alignment of the capture device or the plurality of capture devices relative to the target body,
    wherein at least one of the plurality of markers is capturable through the cutout or through the opening by the capture device or one of the plurality of capture devices.

11. The arrangement as claimed in claim 10, further comprising:
    a controller connected to the capture device or the plurality of capture devices and configured to determine the position and the alignment of the target body by processing capture information obtained by the capture device or by the plurality of capture devices by optically capturing the plurality of markers in the plurality of surface regions.

12. The arrangement as claimed in claim 11, wherein:
    the controller is configured to determine the position and the alignment of the target body by processing additional information, and
    the additional information include:
      information about an identity of at least one of the plurality of surface regions or at least one of the plurality of markers,
      information about a form and/or an arrangement of the plurality of markers, and/or
      information about the arrangement of the plurality of surface regions and/or about a form of the target body.

13. A method for determining a position and/or an alignment of a target body, the target body being a movable part of a coordinate measuring machine, a robot, a material application machine, or machine tool, the target body having a plurality of markers forming a target to be optically captured, the method comprising:
    optically capturing at least two of the plurality of markers arranged in a plurality of surface regions of the target body the plurality of surface regions being differently oriented;
    capturing at least one of the at least two of the plurality of markers in one of the plurality of surface regions through a cutout or through an opening in the target body;
    generating capture information; and
    determining the position and the alignment of the target body by processing the capture information.

14. The method as claimed in claim 13, further comprising:
- determining the position and the alignment of the target body by processing additional information, the additional information including:
- information about an identity of at least one of the plurality of surface regions or of at least one of the plurality of markers,
- information about a form and/or an arrangement of the plurality of markers, and/or
- information about an arrangement of the plurality of surface regions and/or about a form of the target body.

15. The method as claimed in claim 14, further comprising:
- identifying the identity of the at least one of the plurality of surface regions, of the at least one of the plurality of markers in the at least one of the plurality of surface regions, or of the arrangement of the plurality of markers in the at least one of the plurality of surface regions by:
- processing the additional information about the identity of the at least one of the plurality of surface regions or of the at least one of the plurality of markers in the at least one of the plurality of surface regions, and
- evaluating the capture information with regard to a coding in at least one of the plurality of surface regions.

16. The method as claimed in claim 13, further comprising:
- optically capturing at least two of the plurality of markers arranged in the plurality of surface regions of the target body at a same time, at least two of the plurality of surface regions having a different alignment.

17. The method as claimed in claim 13, further comprising:
- in at least one of the plurality of surface regions, capturing at least one of the plurality of markers extending over at least one portion of the at least one of the plurality of surface regions, and/or
- in the at least one of the plurality of surface regions, capturing an arrangement of the plurality of markers distributed over the at least one portion of the plurality of surface regions, and
- determining the alignment of the target body by processing the capture information.

18. The method as claimed in claim 13, further comprising:
- capturing at least one of the plurality of markers in a first of the plurality of surface regions, the first of the plurality of surface regions being formed by a first portion of the target body,
- capturing at least one further marker of the plurality of markers in a second of the plurality of surface regions,
- wherein the first portion of the target body forms the second of the plurality of surface regions and the first and the second of the plurality of surface regions are surface regions of the first portion lying opposite to one another.

19. The method as claimed in claim 13, further comprising:
- capturing a first surface region through the cutout or the opening, and
- preventing a second surface region from being captured through the cutout or through the opening.

20. The method as claimed in claim 13, wherein:
- at least one of the plurality of surface regions lies next to an edge of the cutout or the opening, and
- the method further comprises:
- capturing at least one of the plurality of markers in the at least one of the plurality of surface regions and the at least one of the plurality of surface regions next to the edge of the cutout or the opening.

21. The method as claimed in claim 13, wherein the target body includes a plurality of cutouts through which at least one of the plurality of markers is captured.

\* \* \* \* \*